Feb. 13, 1934.  G. HOLST  1,947,417
ELECTRIC DISCHARGE TUBE
Filed Feb. 29, 1932   2 Sheets-Sheet 1
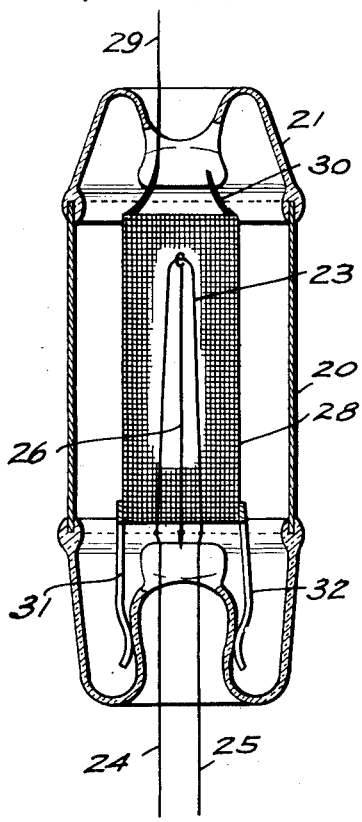
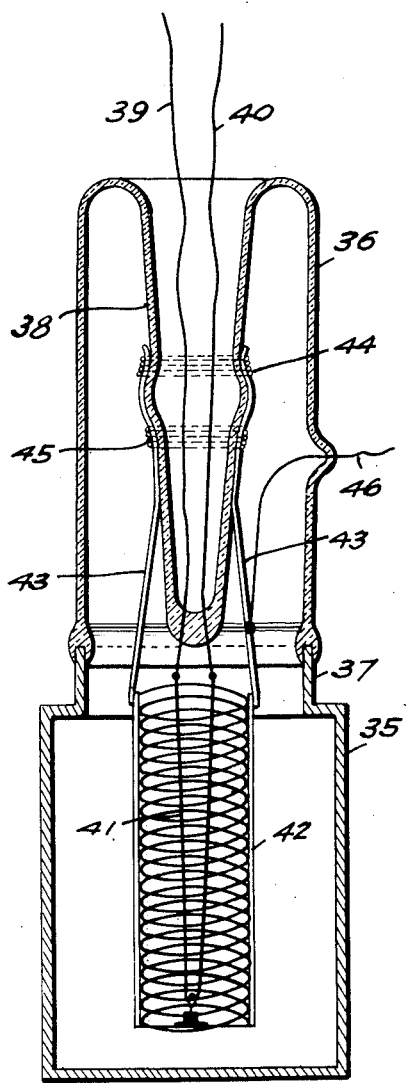
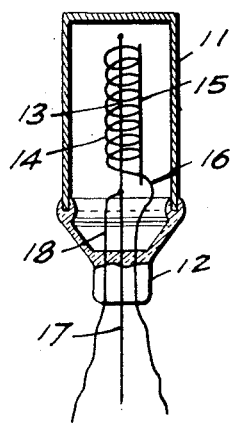
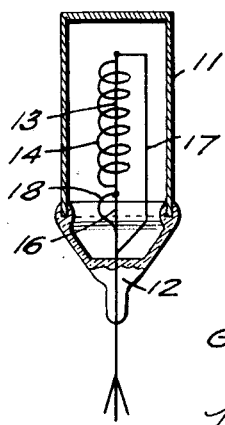
INVENTOR
GILLES HOLST
By Langner, Parry, Card & Langner
ATTORNEYS Feb. 13, 1934. G. HOLST 1,947,417
ELECTRIC DISCHARGE TUBE
Filed Feb. 29, 1932 2 Sheets-Sheet 2
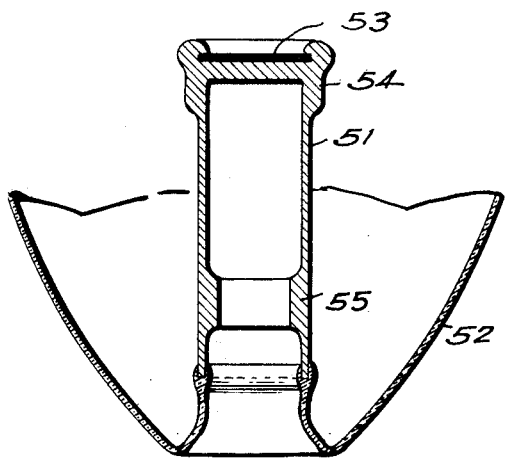
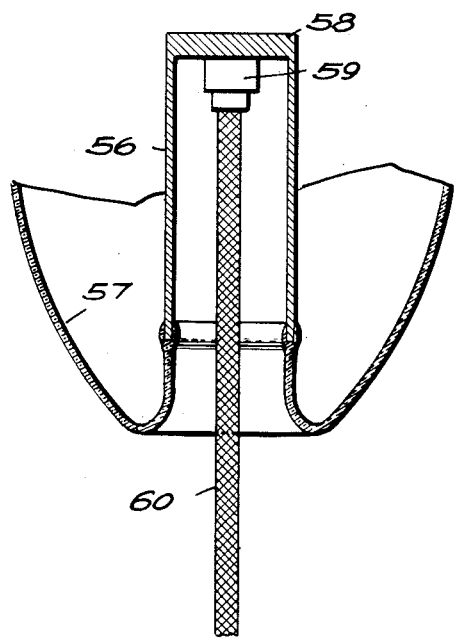
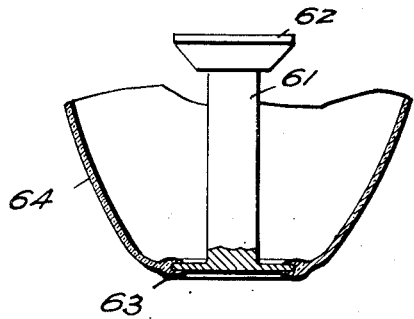
INVENTOR
GILLES HOLST Patented Feb. 13, 1934

1,947,417

UNITED STATES PATENT OFFICE 1,947,417

ELECTRIC DISCHARGE TUBE

Gilles Holst, Eindhoven, Netherlands

Application February 29, 1932, Serial No. 595,928, and in the Netherlands September 15, 1922

5 Claims. (Cl. 250—27.5)

This application is a continuation in part of application, Serial Number 639,028, filed May 14, 1923, and in part of the application, Serial Number 502,774, filed December 16, 1930, which latter in turn is a continuation in part of application Serial Number 610,868, filed January 5, 1923.

This invention relates to electric discharge tubes such as X-ray tubes, rectifiers, amplifiers and other types of radio tubes, etc. The invention embodies a joint or weld particularly adapted for hermetically sealing or joining electrodes, current-conducting members or other metallic parts of such devices to and with the usual glass insulating parts thereof and provides that a substantial part of the wall of such devices is composed of a metallic portion.

The inventon, however, is not limited to the kind of devices specified, it being applicable to many other articles of manufacture, in which metal to vitreous materials are joined, fused, or sealed such as vacuum pump installations and the like.

One of the objects of the invention is to make improved gas-tight seals which are easily established and allow a rigid construction.

Another object of the invention is to avoid the high expenses required by the use of platinum, which is a known metal suitable for being sealed to glass in the shape of a ring or cap of small thickness.

Still another object of the invention is the provision of an electric discharge tube having a metallic member of a chromium iron alloy around the discharge path of the tube and a surface of which member is exposed to the discharge space.

Another object of the invention is to provide for a metal to vitreous material joint which will be capable of withstanding relatively high temperatures.

A further object of the invention is to manufacture articles comprising a vitreous portion sealed to a metallic portion of thick cross section.

The metal to vitreous material joint according to the invention, comprises a hollow body formed of a chrome iron alloy sealed or fused by means of one of its ends in abutting relation with the end of a corresponding hollow vitreous member.

It has been found that the alloy is a very suitable material for such sealing or fusing to glass. Its composition can be so chosen that the co-efficient of expansion of the alloy corresponds closely with that of the glass, but it is not necessary that these coefficients be exactly the same, as will be set out hereinafter.

In accordance with the invention, the metallic part of the tube which is fused or joined to the glass walls, is composed of an alloy of chromium and iron which has been designated chrome iron. Therefore, an object of the invention is to provide an electric discharge tube having a chrome iron member one of the surfaces of which surrounds and is exposed to the discharge space of the tube. In case of an evacuated tube this chrome iron member has one of its surfaces in contact with the evacuating space.

While preferably the entire member is composed of this chrome iron, it is nevertheless, only necessary that the chrome iron part itself only be formed at that part of the member which is joined to the glass and which is exposed to the discharge space of the tube.

A further object of the invention, therefore, contemplates the rigid joining of a vitreous part of an electric discharge tube to a relatively large or massive thick metallic chrome iron part of such tube.

With these and other objects of the invention as will be more fully hereinafter explained, reference may be had to the accompanying drawings in which are shown several constructions embodying the invention and in which:—

Figs. 1 and 2 represent two cross sections of an electric discharge tube provided with three electrodes, one of these electrodes being constituted by a chrome iron metallic portion of the enclosing envelope.

Fig. 3 illustrates a tube provided with three electrodes the said tube including a metal chrome iron vessel which serves as an anode, but containing an incandescent cathode and an auxiliary electrode, which two latter elements are fixed to two glass end members which are joined or fused to the respective ends of the metallic chrome iron vessel.

Fig. 4 illustrates a tube which may serve as a radio tube. In this arrangement the metal vessel also serves as an anode but the glass end member is made considerably larger than in the constructions of the other views so as to provide for better insulation.

Fig. 5 represents a section of an anti-cathode for X-ray tubes which is composed of chrome iron and joined to the glass wall of the tube.

Fig. 6 is a section of an anode for electric discharge tubes such as rectifiers or radio tubes similarly joined to the glass portion of the wall of such tubes. In this view there is shown a conductor wire secured to the bottom closed end of the chrome iron anode, and Fig. 7 represents a construction of an electrode made of chrome iron and fused directly to the glass wall of the tube.

One of the advantages in utilizing chrome iron as the alloy of the metal part of electric discharge tube, in addition to its approximately equal coefficient of expansion with glass, is the fact that this alloy sticks exceedingly well to glass, that is, it wets the glass. In fact it has been observed that chrome iron adheres to the glass at the joint even better than platinum. This offers the advantage that the joint between the metal and glass, even after long use and when exposed to relatively high temperatures, remains unaltered. This stability is due probably also to the fact that chrome iron has a very low heat conductivity as compared to such metals as platinum and copper. Chrome iron in fact approaches nearer in its thermal conductivity to glass than does either of the metals, platinum or copper.

Chrome iron, however, possesses other properties which make it particularly suitable in electric discharge tubes. It contains very little occluded gases, and when used in an electric discharge tube it acts as a "getter". It has high imperviousness, that is, it is exceedingly resistant to the transmission of gases therethrough particularly at the temperatures which take place in the operation of electric discharge tubes. Finally, chrome iron gives rise to very little secondary emissions when this alloy is used as a part of the active elements or as one or more of the active elements of an electric discharge tube.

It has been found that it is unnecessary that the wall of the annular or substantially annular metal part should be very thin or flexible. When desired, it may assume a relatively thick cross section. A thickness of several millimeters and much greater has been found possible without any difficulty as to its joining with the metal or its action as part of electric discharge tubes.

The composition of the chrome iron should of course be such that its coefficient of expansion approaches closely that of the glass to which it is joined. It has, however, been found that differences between these coefficients of expansion may be larger than is ordinarily permitted where chrome iron is used as the metal of leading-in wires. Good results may still be obtained at differences up to 20%. For example, it has been found that excellent results with chrome iron may be obtained, where the alloy has a coefficient of expansion of 10% higher than that of the glass to which it is joined. Nevertheless, it is best to endeavor to equalize as much as possible the coefficient of expansion. The required coefficient of expansion and in connection therewith the composition of the chrome iron depends on the glass used.

Good results may especially be obtained when the percentage of chromium is more than ten and less than fifty percent. In a particular case (when fusing into so-called X-ray glass) an alloy with about 17–20% of chromium is highly satisfying.

Small quantities of impurities may occur in the chrome iron without decreasing its suitability. These impurities may exert some influence on the coefficient of expansion and vary thereby the composition needed. The impurities may be present in the primary body (for example carbon in iron) or they may be introduced into the alloy during the melting-process (for instance manganese or silicon). It is desirable however that the percentage of these impurities should remain low.

In Figs. 1 and 2 a metal vessel serving at the same time as an anode is shown by 11. Fused to the ends of said metal vessel there is a glass end member 12.

The other two electrodes, namely an incandescent filament 13 and an auxiliary electrode 14 are joined to the glass member 12. The end member 12 is stem-shaped as usual in the construction of electric incandescent lamps and discharge-tubes and is fused to the metal vessel 11.

Leading-in wires 17 and 18 for the incandescent filament and a leading-in wire 16 for the auxiliary electrode are fused into the said glass stem. The incandescent filament 13 may consist of tungsten or of any other suitable refractory material. The auxiliary electrode 14 consists of a wire, wound in the form of a coil, of for instance molybdenum, and is fixed to a metal support 15.

According to the invention the metal vessel 11 consists of a chrome iron alloy. When this alloy has the correct composition it is very readily fusible to glass; moreover it is non-porous, so that there is little or no gas diffusion through the metal wall, which permits of obtaining and maintaining in the interior of the tube as high a vacuum as is customary in the so-called "hard" valves.

Another advantage is that the chrome-iron alloy is a material absorbing very few gases, so that when evacuating the tube chrome iron is much easier to be deprived of occluded gases than other metals such as copper, iron, etc.

The high vacuum may be obtained in any well-known manner, for example by evacuating the tube with vacuum-pump and at the same time heating the metal parts in the interior of the tube to a high temperature in order to deprive them of all occluded gases. The high temperature of the anode and the auxiliary electrode can be caused by a bombardment by electrons in the known manner. The vacuum can be improved in known manner by providing in the tube a suitable chemical substance, such for example as phosphorous pentoxide ($P_2O_5$).

Generally it is not necessary to deprive the material previously of occluded gases. It may however be desirable that the chrome iron should be melted in vacuum so as to simplify the subsequent deprivation of gases in the tube.

As the heat supplied to the anode can easily be led away, the generating tube may have a very compact form and is considerably less fragile than in the case of a vitreous outer wall.

The tube illustrated in Figs. 1 and 2 may contain a gaseous filling, for example a rare gas such as argon of low pressure (below 0.1 millimeter of mercury).

The tube shown in Fig. 3 is suitable for great capacities. In this construction the anode 20 has the form of a metal cylinder open at both ends. Glass end members 21 and 22 are fused to the ends of the said cylinder. The incandescent filament 23 is attached to the end member 22, and the auxiliary electrode 28 to the end member 21. The leading-in wires 24 and 25 for the incandescent filament are fused into the stem forming part of the end member 22 and the leading-in wire 29 of the auxiliary electrode 28 is fused into the stem forming part of the end member 21. This construction presents the advantage that the leading-in wires for the incandescent filament and the auxiliary electrode are better insulated from each other than if fused together into one stem. Especially in the case of transmission tubes in which the tension between the incandescent filament and the auxiliary electrode may reach a considerable value, it is sometimes difficult to obtain a good insulation if all the leading-in wires are fused into one stem, as an electrolytic conduction occurs through the glass. In such cases a construction according to Fig. 3 is advantageous. The incandescent filaments 23 are shaped as an extended V supported at the top 26 attached to the end member 22.

The auxiliary electrode 28 consists of a metal gauze and is fixed on one side to the end member 21 by the leading-in wire 29 and supporting wires 30 and on the other side to the end member 22 by means of springs 31 and 32.

In the case of tubes in which the metal vessel serves as an anode it is not necessary to fuse in leading-in wires for the anode, as it is possible to provide an external contact in some suitable manner to this electrode.

The tube provided with three electrodes shown in Fig. 4 is also applicable as a radio tube of great capacity.

In this embodiment of the invention the glass member 36 is tubular shaped and has a re-entrant portion 38. The metallic part 35 constitutes the anode of the device and has the form of a cylinder closed at one end and fused into the glass member at its open end.

The deep indentation in the glass member 36 ensures a good insulation between the leading-in wires 39 and 40 of the incandescent filament 41, leading-in wire 46 and the electrode 42. The cathode 41 is supported by its leading-in wires 39 and 40 which are fused into the reentrant portion 38. It is furthermore supported by the grid 42 in the well known manner by a spring. The grid 42 itself is fixed to the re-entrant portion by means of resilient supports 43, fastened to the re-entrant portion by ligatures 44 and 45.

In this construction also the metal vessel 35 serves as an anode. The vessel is preferably constructed wholly of chrome iron but it may also comprise a portion of metallic material other than chrome iron, a connecting part such as the chrome iron ring 37 being used in the latter case for hermetically sealing the metallic material to the glass member. The ring 37 is fused to the glass on one side and hermetically united to the metallic material on the other side, for instance by electric welding or in any other suitable way.

The construction shown in Fig. 4 presents the same advantages as the other constructions. In this case also an external contact may be provided in some suitable manner to connect to the anode which may be placed in a cooling medium.

In Fig. 5 the tubular body of chrome iron is indicated by 51. At the open end the tube is fused into the glass 52. The composition must be such that during the fusing-in operation no clefts or cracks occur in the glass and a good hermetical seal of the glass with the electrode is obtained. In practice when using a special sort of glass, sometimes called Röntgen glass good results have been obtained with an alloy containing about 17% of chromium. However, also other compositions may give satisfaction, depending on the nature of the glass and on the quality of the iron and chrome. Small impurities contained in the chrome iron, which may consist of carbon, silicon or other substances, may slightly affect the percentage to be used. In general, good results can be obtained with an alloy of chrome-iron containing 15-30% of chromium.

The tubes in the form illustrated, is closed by a bottom of chrome iron, while at the side of the bottom which is exposed to the interior of the X-ray tube, a small plate 53 of platinum is fixed, for which purpose the edge 54 of the chrome iron is bent around the periphery of the plate 53. Instead of platinum, any other suitable refractory material, such as tungsten for example, may be used. The interior of the hollow tube 51 may be cooled in any desired manner commonly used with X-ray tubes. Threads may be cut into the reinforced part 55 of the tube in order to enable the attachment of a cooling device.

An anticathode, according to the invention, may be advantageously made of one piece of chrome iron. There is then less probability of air leaks occurring than in the case of the commonly used copper electrode, fused in by means of a platinum ring.

The chrome iron material is not porous so that even with a relatively small thickness of the wall of the tube for example, less than 1 millimeter, the vacuum in the X-ray tube does not decrease.

It is customary, when manufacturing X-ray tubes to deprive the material of the anti-cathode of gases, for which purpose it is brought to red-heat, for example, by the bombardment of electrons, while the tube is evacuated. This deprivation of gases is done much quicker when using an electrode according to the invention, than in the case of the usual copper electrode, which is probably due to the fact that chrome iron is a material which holds only very few gases.

Obviously, the present invention may also be similarly applied to cathode of X-ray tubes.

In Fig. 6 is shown an anode, suitable for discharge tubes such as receivers or amplifiers for radio use.

The electrode 56 consists of a hollow tubular member of chrome iron, which at its open side, is fused into the glass 57. At this place the tubular member may be thinner if desired than at points distant from this place, so as to facilitate the fusing-in, although such thinning is not usually necessary. The electrode has a bottom or end indicated at 58, the thickness of which bottom is usually greater than that of the side walls of the chrome iron tube. A leading-in wire 60 of twisted rubber covered strands is fixed to the bottom 58 by means of a small block 59 of nickel that is secured against the bottom 58 for example, by electric welding. Obviously, it is possible to fix the leading-in wire also in any other suitable manner. Here again in this form of the invention the chrome iron material of the electrode may have the composition described above. The anode shown in Fig. 6 offers in general the same advantages as the anti-cathode represented in Fig. 5.

In the interior of the electrode, according to the invention, other materials than chrome iron may be applied, if only at the place of fusing-in chrome iron exclusively is used. It is also possible to make the electrode, according to the invention, partly massive, if only care is taken that a sufficiently broad projecting part of chrome iron remains so as to enable the hermetical fusing into the glass.

The electrode shown in Fig. 7, consists likewise entirely of chrome iron. According to this embodiment of the invention, the electrode consists of a member 61 provided with an enlarged end piece 62 and with a projecting part or disk at the other end 63, which disk is fused into the glass 64. The electrode as illustrated, may be made entirely in one piece. It is also possible for some purposes to apply at the end 62 of the electrode any other suitable materials for example, such as nickel, platinum, tungsten and the like.

As hereinabove stated the invention is not limited to discharge tubes of the kind illustrated. It has been found that the chrome iron to vitreous material joint as embodied in the invention, affords particularly great advantages when applied to discharge tubes having a high vacuum and designed to be operated with high tension, such as X-ray tubes, as well as with other types of electric discharge tubes such as utilize gaseous fillings at relatively low pressures.

With respect to discharge tubes for the generation of X-rays, difficulties have often been encountered in these tubes, due to secondary electrons being emitted, from metal parts of the tubes. These disadvantages are highly reduced and almost entirely eliminated by utilizing the invention in which chrome iron alloys are used in place of the metals used heretofore, since these chrome iron alloys show little secondary electron emission.

In X-ray tubes and other high tension space discharge devices there are often metal parts close to each other which have very high potential differences, so that the potential-gradient between these parts is extraordinarily great. In accordance with the invention the metal to vitreous material joint described may be employed in space discharge devices of this nature, the operation of the tubes being accompanied by the substantial absence of discharges between the metal parts at small distances from each other even when the potential-gradient between these parts is of the magnitude of $10^6$ volts/cm.

This property and that of the little secondary emission were wholly unexpected and unforeseen prior to the invention as is the valuable characteristic that there is little or no gas diffusion through the metal parts of the wall even if a considerable portion thereof consists of chrome iron. This gas diffusion has always been a bothersome fault of all previous tubes employing large masses of metal, which however is obviated by the present invention.

The imperviousness of chrome iron is thus of marked advantage in enabling a greater part of the envelope of the electric discharge tubes to be made of this metal, particularly over either of the metals, platinum and copper. Platinum is notoriously pervious to gases when heated and is thus unsuitable for the walls or envelopes of discharge tubes, and copper similarly, is porous and cannot be used successfully for such purpose. Making the envelope of the electric discharge tube in part of chrome iron thus permits the realization of a tube that is as impervious at the metal part, as at or through the glass parts and yet due to the fact that part of the envelope is of metal enables an easy and ready cooling of the tube by any of the usual methods.

Finally, electric discharge tubes made in accordance with the invention and provided with a metallic alloy to glass joint, present the advantage of great rigidity and less fragility than is the case in which the electric discharge tubes have their entire envelope composed of vitreous material.

I claim:

1. An electric discharge tube having an envelope comprising metal and glass members, the metal being chrome iron and forming a substantial part of the envelope and being firmly fused to the glass, at least one surface of which chrome iron member is exposed to the discharge space of the tube.

2. An electric discharge tube comprising an envelope of vitreous material and an electrode fused directly to the wall thereof, and forming a substantial part of said wall, said electrode consisting of chrome-iron at the place of fusion and presenting a surface of chrome-iron alloy to the interior of the tube.

3. An electric discharge tube comprising an envelope of vitreous material, a tubular electrode extending into the envelope, the inner end of said electrode being closed and the open end being fused directly to the wall of the envelope and being open to the atmosphere, said electrode consisting of chrome-iron.

4. An electric discharge tube comprising an envelope of vitreous material, a tubular electrode extending into the envelope, the inner end of said electrode being closed and the open end being fixed directly to the wall of the envelope and being open to the atmosphere, said electrode consisting of chrome-iron at the place of fusion and presenting a surface of chrome-iron to the interior of the tube.

5. An electrode for discharge tubes comprising a tubular member of chrome-iron closed at one end, fused at its open end in abutting relation directly to the vitreous wall of a discharge tube and constituting a substantial portion of the wall of the tube.

GILLES HOLST.